July 9, 1929.  J. CRIPE  1,720,169
LAWN TRIMMER
Filed Jan. 10, 1928
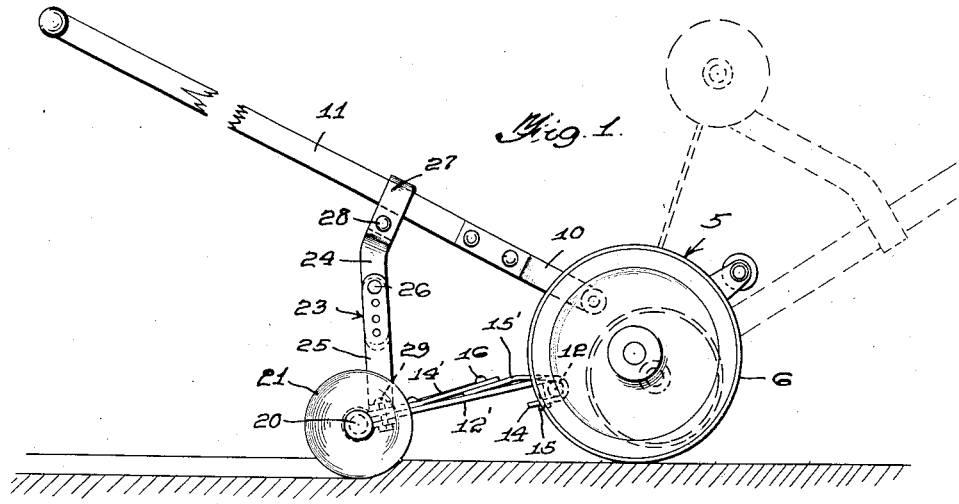
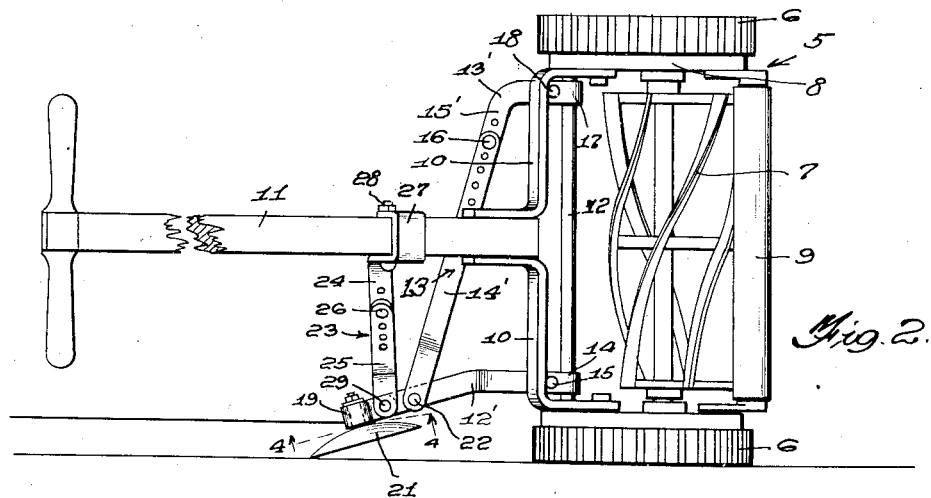
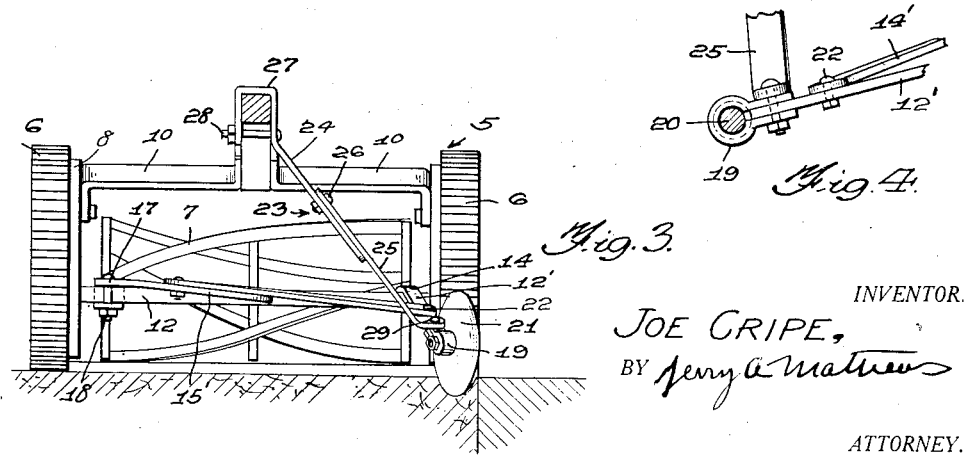
INVENTOR.
JOE CRIPE,
BY Jerry A. Mathews
ATTORNEY.

Patented July 9, 1929.

1,720,169

UNITED STATES PATENT OFFICE.

JOE CRIPE, OF TULSA, OKLAHOMA.

LAWN TRIMMER.

Application filed January 10, 1928. Serial No. 245,670.

My invention relates to an attachment to be mounted upon a lawn mower for trimming the sod or soil of grass, such as along walks, flower beds, and other places.

In accordance with my invention, I provide a sod trimming device which is in the nature of an attachment and is adapted to be installed upon the ordinary hand operated lawn mower. The attachment is preferably applied to the lawn mower when the lawn mower is inverted, whereby the rotary cutter of the lawn mower is not actuated during the trimming operation, and the attachment will not operate when the rotary cutter of the lawn mower is being used to cut the grass. The device is extremely simple in construction, cheap to manufacture, strong and durable.

In the accompanying drawings, forming a part of this specification, and in which like numerals are employed to designate like parts throughout the same, Figure 1 is a side elevation of a trimming attachment embodying my invention, showing the same applied to a lawn mower, Figure 2 is a plan view of the same, Figure 3 is an end elevation of the attachment, and, Figure 4 is a transverse section taken on line 4—4 of Figure 2.

In the drawings, wherein for the purpose of illustration, is shown a preferred embodiment of my invention, the numeral 5 designates a lawn mower as a whole of any well known or preferred construction. This lawn mower embodies the usual wheels 6, driving the rotary cutter 7. The lawn mower embodies a frame work 8, carrying the ground engaging roller 9. Straps 10 are pivoted to the frame work, and carry the handle 11. Attached to the frame work is the usual transverse rod 12. The above description is that of the ordinary lawn mower, which is well known in the art, and no further description is thought to be necessary.

My attachment embodies a generally horizontal frame, comprising bars or straps 12' and 13. The strap 12' has its forward end bent into a loop 14, surrounding the rod 12 and clamped thereto by means of a bolt 15. The strap 13 is longitudinally adjustable and is formed in sections 14' and 15', with their ends overlapping, and apertured for receiving a bolt 16. By this means the section 15' may be adjusted longitudinally, with respect to the section 14', and clamped thereto by means of the bolt 16. The section 15' is provided at its free end with an eye 17, identical with the eye 14, and this eye receives the rod 12 and is equipped with a bolt 18, whereby the eye may be clamped to the rod 12. At its rear end, the strap 12' has rigidly secured thereto a sleeve or bearing 19, carrying a pin or shaft 20, upon which a cutter or disk 21, is rotatable. The rear end of the section 14' is arranged upon the section 12', and is attached thereto by means of a bolt 22.

The numeral 23 designates an adjustable angular brace, formed in sections 24 and 25, having overlapping apertured ends, adjustably connected by means of a bolt 26. The upper section 24 is bent into a socket 27, adapted to straddle the handle 11, and to be clamped thereto by means of a bolt 28. The lower end of the section 25 is arranged upon the strap 12', and is attached thereto by means of a bolt 29.

In use, the lawn mower is first inverted so that the ground engaging roller 9 will project upwardly, and the rotatable cutter will not function when the lawn mower is pushed forwardly. The straps 12' and 13 are suitably adjusted as applied to the rod 12, while the strap 23 is applied to the handle 11. The cutter or blade 21 is angularly positioned, and will cut or trim the sod along a walk or the like, as the machine is pushed forwardly. When the lawn mower in turned over to the proper position to cut the grass, with the roller 9 engaging the grass, the cutter 21 will project upwardly, and be out of the way and will not interfere with the ordinary function of the lawn mower in cutting grass. It is, therefore, seen that it is not necessary to remove the attachment in order to use the lawn mower in the usual manner.

It is to be understood that the form of my invention, herewith shown and described, is to be taken as a preferred example of the same, and that various changes in the shape, size, and arrangement of parts may be resorted to without departing from the spirit of my invention, or the scope of the subjoined claims.

Having thus described my invention, I claim:

1. A sod trimming attachment for a lawn mower comprising a frame, said frame including a pair of connected bars provided at their forward ends with means for attachment to a relatively stationary part of the lawn mower, a cutter carried by the frame, and a diagonal brace attached to the frame and secured to the handle of the lawn mower.

2. In a sod cutting attachment for a lawn mower, a bar provided at its forward end with a socket for receiving a relatively stationary part of the lawn mower, a bearing secured to the rear end of said bar, a shaft carried by the bearing, a cutter mounted upon the shaft, a longitudinally adjustable bar secured to the rear end of the first named bar and provided at its forward end with a socket to receive the relatively stationary element, and an upstanding longitudinally adjustable brace having its lower end attached to the first named bar and its upper end provided with a socket to receive the handle of the lawn mower.

In testimony whereof I affix my signature.

JOE CRIPE.